_United States Patent Office_

3,763,176
Patented Oct. 2, 1973

3,763,176
BACTERICIDAL 3-HALO-5-ALKYL-
Δ²-THIADIAZOLIN-4-ONE
Gustave K. Kohn, Berkeley, and Malcolm S. Singer, Richmond, Calif., assignors to Chevron Research Company, San Francisco, Calif.
No Drawing. Filed Mar. 8, 1972, Ser. No. 232,961
Int. Cl. C07d 91/68
U.S. Cl. 260—302 D                  3 Claims

ABSTRACT OF THE DISCLOSURE

The present invention is directed to 3-halo-5-alkyl-Δ²-thiadiazolin-4-ones and their use as bactericides.

BACKGROUND OF THE INVENTION

The present invention relates to 1,2,5-thiadiazole derivatives and their use as pesticides.

Certain derivatives of 1,2,5-thiadiazoles are known. See, for example, U.S. Pat. 2,990,408 and U.S. Pat. 2,990,409, issued June 27, 1961, to M. Carmack and L. M. Weinstock, and U.S. Pat. 3,115,497, issued on Dec. 24, 1963, to R. D. Vest.

DESCRIPTION OF THE INVENTION

The 3-halo-5-alkyl-Δ²-thiadiazolin-4-ones of the invention are represented by the Formula I

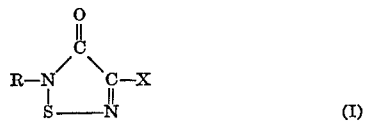

wherein R is alkyl of 1 to 4 carbon atoms, e.g., methyl, ethyl, n-propyl, isopropyl, n-butyl, etc. and X is chlorine or bromine. Representative compounds of the invention therefore are 3-chloro-5-methyl-Δ²-thiadiazolin-4-one,
3-chloro-5-ethyl-Δ²-thiadiazolin-4-one,
3-bromo-5-methyl-Δ²-thiadiazolin-4-one,
3-bromo-5-ethyl-Δ²-thiadiazolin-4-one,
3-chloro-5-propyl-Δ²-thiadiazolin-4-one and
3-chloro-5-sec.butyl-Δ²-thiadiazolin-4-one.

For convenience, for the compounds of the invention are represented by a single formula (i.e., Formula I). However, it is appreciated, of course, that the quasi-aromatic compounds of the invention can be represented by other structural formula, e.g., by the resonance structure depicted by the following formula

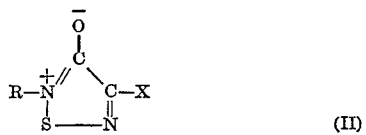

wherein R and X are as defined above.

The compounds of the invention are prepared by reacting a N-alkyl cyanoformamide with a sulfur dihalide in the presence of an acid acceptor, at a temperature of from 5 to 35° C. for a time of from 1 to 4 hours, according to the following equation:

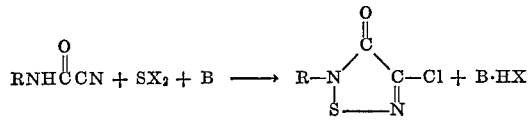

wherein R and X have the same significance as defined above and B is an acid acceptor. Suitable acid acceptors are organic amines such as triethylamine, pyridine or dimethylaniline. Generally, the molar ratio of N-alkyl cyanoformamide to sulfur dihalide is from about 1:1 to 1:2 and the molar ratio of N-alkyl cyanoformamide to acid acceptor is from about 1:1 to 1:10.

The preparation of the compounds of the invention are illustrated by the following examples.

EXAMPLE 1

Preparation of 3-chloro-5-methyl-Δ²-thiadiazolin-4-one

A solution of 8.6 (0.1 mole) of N-methyl cyanoformamide and 10.1 g. (0.1 mole) of triethylamine in methylene dichloride was added dropwise to a solution of 20.6 g. (0.2 mole) of sulfur dichloride in methylene dichloride cooled in an ice bath. After all the cyanoformamide solution was added, the ice bath was removed and agitation continued at room temperature. The total elapsed time was about one hour. The total volume of methylene dichloride solvent employed was 100 ml. The methylene dichloride solvent was evaporated and residue extracted with n-hexane. The n-hexane solution was evaporated. The resulting residue was recrystallized from n-hexane to give 3-chloro-5-methyl-Δ²-thiadiazolin-4-one crystals, M.P. 115–118° C. Elemental analysis showed:
Calculated (percent): N, 18.6; Cl, 23.54; S, 21.3.
Found (percent): N, 18.2; Cl, 23.87; S, 20.95.

EXAMPLE 2

Preparation of 3-chloro-5-ethyl-Δ²-thiadiazolin-4-one

A solution of 9.8 g. (0.1 mole) N-ethyl cyanoformamide and 10.1 g. (0.1 mole) triethylamine in methylene dichloride was reacted with a solution of 20.6 g. (0.2 mole) of sulfur dichloride in methylene dichloride by a pressure similar to that of Example 1. After two recrystallizations from carbon tetrachloride and petroleum ether, the 3-chloro-5-ethyl-Δ²-thiadiazolin-4-one melted at 58–59.5° C. Elemental analysis showed:
Calculated (percent): Cl, 21.54; S, 19.5. Found (percent): Cl, 21.2; S, 18.6.

UTILITY

The thiadiazolin-4-one compounds of this invention are useful for controlling pathogens such as bacteria, algae, fungi and yeasts. The compounds of the invention are particularly effective in the control of bacteria. When used as bactericides, the compounds of this invention are formulated and applied in bactericidal amounts by conventional art methods to bacteria or hosts (growth environment) which are subject to bacterial attack, especially vegetative hosts such as plants, plant seeds, etc. The amount used will, of course, depend on several factors such as the host, the type of bacteria, and the particular 3-halo-5-alkyl-Δ²-thiadiazolin-4-one. The thiadiazolin-4-ones of this invention may be combined with inert liquids and solid carriers such as powders, solutions, dispersions, etc., for such use. The thiadiazolin-4-ones of this invention will generally be admixed with biologically inert liquids or solids in an amount from about 0.05 to 95 weight percent. Higher or lower amounts, of course, can be used. Preferably from 1 to 50 weight percent of the composition will be the thiadiazolin-4-one.

Typical solid carriers which are suitably used to formulate the thiadiazolin-4-ones are clay, talc, chalk and sawdust. Representative solvents which are suitably used to formulate the thiadiazolin-4-ones include aromatic hydrocarbons such as xylene, benzene, toluene, petroleum fractions, alcohols (especially low molecular weight alkanols) and chlorinated aliphatic hydrocarbons such as chloroform, methylene chloride and the like. These formulations may also contain emulsifying agents, sticking agents, fillers and other compatible pesticides.

The following examples illustrate the bactericidal activity of the compounds of the invention.

EXAMPLE 3

3-chloro-5-methyl-$\Delta^2$-thiadiazolin-4-one and 3-chloro-5-ethyl-$\Delta^2$-thiadiazolin-4-one were tested for the control of *Pseudomonas syringae* and *Erwinia carotorora* by the following procedure.

Bacterial suspensions were prepared by washing a culture of the desired bacteria from an algae slant with sterile water into a vessel and further diluting the aqueous suspension to 250 ml. with sterile water.

The thiadiazolin-4-one to be listed was dissolved in acetone to 250 p.p.m. and 0.02 ml. of this solution was pipetted onto each of two surface areas on a plate covered with 20 ml. of Emerson's agar. The treated agar plates were then sprayed with the bacteria suspension and the plates containing the bacteria were incubated for 44 to 48 hours at 24° C. The two treated areas of the plates were then observed for bacterial growth.

3-chloro-5-methyl-$\Delta^2$-thiadiazolin-4-one and 3-chloro-5-ethyl-$\Delta^2$-thiadiazolin-4-one were found to completely inhibit the growth of *Pseudomonas syringae* and *Edwinia carotorora*.

EXAMPLE 4

3-chloro-5-methyl-$\Delta^2$-thiadiazolin-4-one and 3-chloro-5-ethyl-$\Delta^2$-thiadiazolin-4-one were tested for the control of bacterial leaf spot *Xanthomonas vesicatoria* on tomatoes under greenhouse conditions.. For comparison purposes, N-trichloromethylthio-4-cyclohexene - 1,2 - dicarboximide (sold commercially as Captan) and N-(1,1,2,2-tetrachloroethylthio) - 4 - cyclohexene-1,2-dicarboximide (sold commercially as Difolatan® toxicant) were tested under identical conditions.

Tomato plants (v. Bonny Best) were sprayed with 250 p.p.m. solution of the candidate toxicant in acetone and water and a small amount of a nonionic surfactant. The treated plants were allowed to dry and then inoculated with the bacteria. The inoculated plants were transferred to semi-controlled greenhhouses maintained at 76–80° F. daytime and 68–70° F. nighttime and 60–80% relative humidity. The rate of disease development was determined after 4 to 6 days. The percent control was based on a bacterial count on toxicant treated plants compared with nontreated control plants. The results are tabulated in Table I.

TABLE I

| Compound: | Control (percent) of *X. vesicatoria* |
|---|---|
| 3-chloro-5-methyl-$\Delta^2$-thiadiazolin-4-one | 91 |
| 3-chloro-5-ethyl-$\Delta^2$-thiadiazolin-4-one | 12 |
| Captan toxicant | 61 |
| Difolatan® toxicant | 67 |

EXAMPLE 5

3-chloro-5-ethyl-$\Delta^2$-thiadiazolin-4-one and, for comparison, streptomycin sulfate, were tested for the control of *Agrobacterium tumafaciens* by the following procedure.

The toxicant compound dissolved in acetone was added to a vial containing Emerson broth (a commercial broth containing beef extract, bacto-peptone, sodium chloride, yeast extract and dextrose) which had been diluted with water (mixture I). Twenty-four hours prior to the test an *A. tumafaciens* bacterial suspension was prepared by adding an eight-day old colony of the bacteria to Emerson broth, incubated at 76–78° F. for twenty-four hours and diluted with water (mixture II). The bacterial suspension (mixture II) was added to the vial containing the Emerson broth-toxicant compound (mixture I). The resulting mixture was held at 23–24° C. for 40–48 hours. The growth of the bacteria in the toxicant-treated medium was compared with the growth of the bacteria in a solvent-control medium. The percent control at different dosage levels was then determined. The results are reported in Table II.

TABLE II

| Compound | Control (percent) of *A. tumafaciesis* | | |
|---|---|---|---|
| | 10 p.p.m. | 4 p.p.m. | 1.6 p.p.m |
| 3-chloro-5-ethyl-$\Delta^2$-thiadiazolin-4-one | 97 | 95 | 35 |
| Streptomycin sulfate | 77 | 49 | 29 |

In additional tests, the compounds of the invention were found to control the growth of bacteria such as *Xanthomonas phaseoli*, *Corynbacteria michiganense*, *Erwinia amylovora* and *Pseudomonas lachrymans* and fungi such as *Rhizoctonia solani* and *Monolinic fructicola*.

As will be evident to those skilled in the art, various modifications on this invention can be made or followed, in the light of the foregoing disclosure and discussion, without departing from the spirit or scope of the disclosure or from the scope of the following claims.

We claim:
1. 3-halo-5-alkyl-$\Delta^2$-thiadiazolin-4-one wherein the halogen is chlorine or bromine and the alkyl is of from 1 to 4 carbon atoms.
2. The compound of claim 1, said compound being 3-chloro-5-ethyl-$\Delta^2$-thiadiazolin-4-one.
3. The compound of claim 1, said compound being 3-chloro-5-methyl-$\Delta^2$-thiadiazolin-4-one.

References Cited

UNITED STATES PATENTS 3,419,573   12/1968   Weinstock _____ 260—302 D

RICHARD J. GALLAGHER, Primary Examiner

U.S. Cl. X.R.

71—67, 90; 124—270